United States Patent

[11] 3,595,425

| [72] | Inventors | Clara V. Eicholtz<br>Midland;<br>Bertrand N. Trombley, Bloomfield Hills,<br>both of, Mich. |
|---|---|---|
| [21] | Appl. No. | 847,569 |
| [22] | Filed | Aug. 5, 1969 |
| [45] | Patented | July 27, 1971 |
| [73] | Assignee | The Dow Chemical Company<br>Midland, Mich. |

[54] VENTED COMPARTMENTED FOOD TRAY
11 Claims, 4 Drawing Figs.

[52] U.S. Cl. .................................................. 220/20,
220/23.6, 220/44 R, 220/97 R
[51] Int. Cl. ............................................... B65d 1/24,
B65d 21/02, B65d 51/16
[50] Field of Search .................................... 220/20,
23.6, 23.8, 97, 97 F, 9 F, 44, 44 R, 97 R

[56] References Cited
UNITED STATES PATENTS

| 1,755,200 | 4/1930 | Zallio | 220/97 F X |
|---|---|---|---|
| 2,641,912 | 6/1953 | Lawler | 220/23.8 |
| 3,103,278 | 9/1963 | Kuzma | 220/97 X |
| 3,107,027 | 10/1963 | Hong | 220/23.8 |

Primary Examiner—George E. Lowrance
Attorneys—Griswold and Burdick, Richard G. Waterman and Lloyd E. Hessenaur, Jr.

ABSTRACT: A compartmented food tray used to transport hot foods to a serving area remote from the cooking area. The tray includes a lid which mates with a plate to segregate the tray into spill-over free compartments. Each compartment has a complementary stacking feature in its lid and plate sections which permits nesting of trays in a stack. Each stacking feature in the lid includes a vent disposed to permit escape of excess steam and moisture even when the trays are nested.

INVENTORS.
Clara Virginia Eicholtz
Bertrand N. Trombley

BY Griswold & Burdick
ATTORNEYS

PATENTED JUL27 1971

INVENTORS.
Clara Virginia Eicholtz
Bertrand N. Trombley
BY
Griswold & Burdick
ATTORNEYS

VENTED COMPARTMENTED FOOD TRAY

DESCRIPTION OF THE INVENTION

There has long been a need to provide a compartmented tray made of inexpensive materials which can be employed to transport hot foods from a cooking area to a serving area which may be located many miles away. It is desirable in such a tray that the food be kept separated, such trays be nestable, and accumulations of moisture on the underside of the lid be controlled when hot foods are contained in the tray. It is also desirable that such trays be adapted for one time service use, that is, be considered disposable. Therefore, fabrication costs must be kept to a minimum and the trays must be adapted to automated handling.

The particular compartmented tray of this invention is readily adapted for institutional uses, such as in schools, state homes for the handicapped, prisons and the like. Early compartmented trays available on the market employ venting around the lid periphery thereby allowing the lid to fit looser than is desired. These prior trays have also had problems in that food, some of it being moist or in a semiliquid form, can wick from one compartment to the other or through the venting holes on the side of the tray.

Accordingly, it is among the objects of the present invention to provide inexpensive compartmented trays for use in the transport of hot foods, which trays maintain the food in compartments without spill-over during transportation, are nestable and prevent excess accumulation of moisture on the inner lid surface.

Briefly, the present invention is accomplished by having a compartmented tray which is formed of thermoplastic material and includes mating lid and plate compartments. The compartments are segregated from one another by mating partitions extending in opposed disposition from the lid and plate. Stacking bosses and recesses are incorporated in each compartment of the plate and lid, respectively, so that the bosses of a plate of one tray fit within the recesses formed in the lid of another tray. The lid has a venting passageway in each of its stacking recesses, which venting passageway is just sufficient to release a limited amount of accumulated moisture which would otherwise condense on the inner lid surface and drop back on the food when hot foods are being transported.

Yet additional objects and advantages of the present invention are even more apparent when taken in conjunction with the accompanying drawing in which like characters of reference designate corresponding material and parts throughout the several views thereof, in which.

Figure 1:
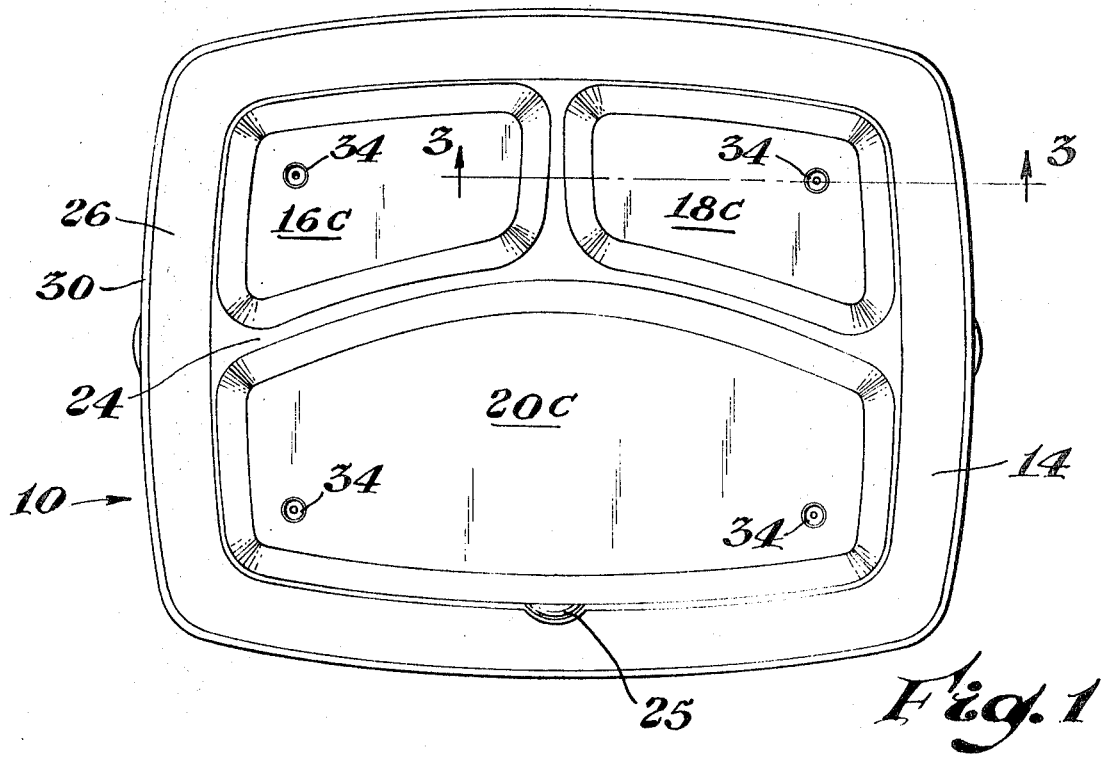
FIG. 1 is a plan view of a compartmented tray incorporating the principles of the present invention.
Figure 2:
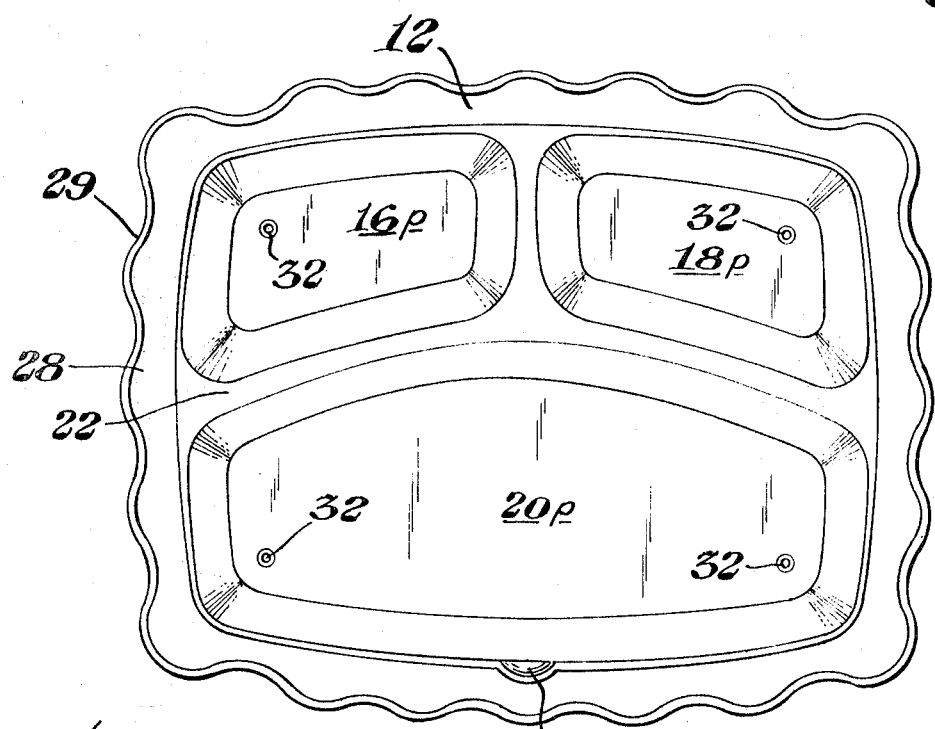
FIG. 2 is a plan view of the tray of FIG. 1 only with the lid removed.
Figure 3:
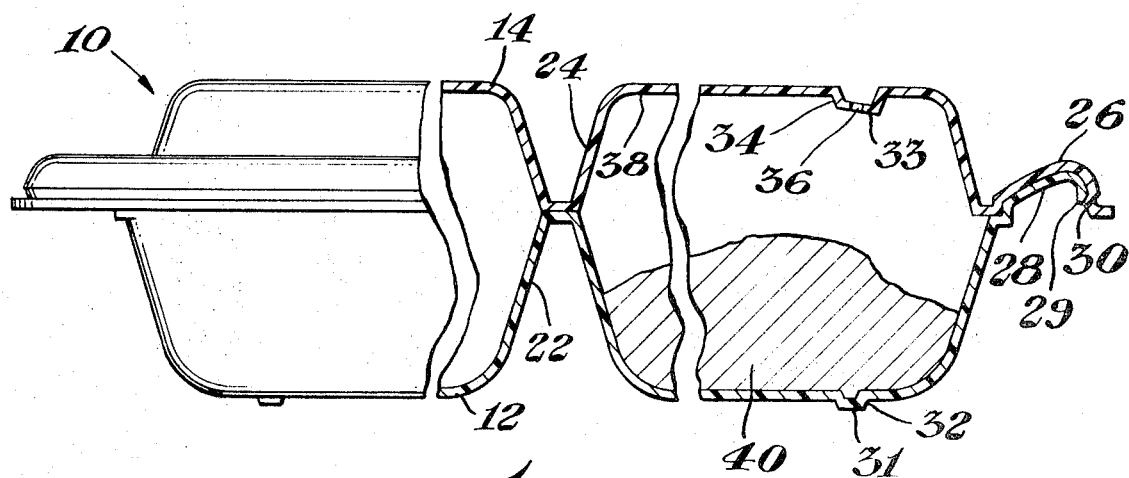
FIG. 3 is a cross-sectional view of the tray taken along reference line 1—1 of FIG. 1.

Referring particularly to FIGS. 1 to 3, there is shown a compartmented tray 10 having a plate or dish 12 and a lid 14. Plate 12 is segregated into compartments 16p, 18p and 20p. Lid or cover 14 is segregated into compartments 16c, 18c and 20c of a like peripheral extent and mating with compartments 16p, 18p and 20p, respectively, of the plate 12. About the periphery of the compartments 16p, 18p and 20p is a partition 22 extending upwardly from plate 12. Likewise about the periphery of compartments 16c, 18c and 20c is a partition 24 extending downwardly from lid 14. Partitions 22 and 24 extend a sufficient distance to mate tightly against one another when the lid 14 is closed with the plate 14. The lid is held closed by a peripheral flange 26 being matingly engaged with a peripheral flange 28 of plate 12.

The lid flange 26 includes a snap-over abutment 30 receiving the outer edge 29 of plate flange 28. The character of the usual material forming the tray, such as a thermoplastic resin formed of polystyrene foam, for example, has the necessary resiliency to provide for such snap-over engagement.

To aid in aligning the front of a lid with a front of a plate, and to insure against a plate mistakenly being used for a lid with another plate, a crescent-shaped indexing tab 25 protruding downwardly slightly from the surface of lid flange 26 can mate in a crescent-shaped indexing tab 25 protruding downwardly slightly from the surface of lid flange 26 can mate in a crescent-shaped indexing well 27 extending downwardly approximately a like distance into plate flange 28. Alternately, of course, the indexing tab could be located in plate flange 28 and the indexing recess in lid flange 26, if desired.

Included in the bottom of plate 12 are stacking bosses 32, at least one being located in each of the compartments 16p, 18p and 20p. These bosses are adapted to fit into corresponding recesses 34 located in each of the compartments 16c, 18c and 20c of the lid 14.

Figure 4:
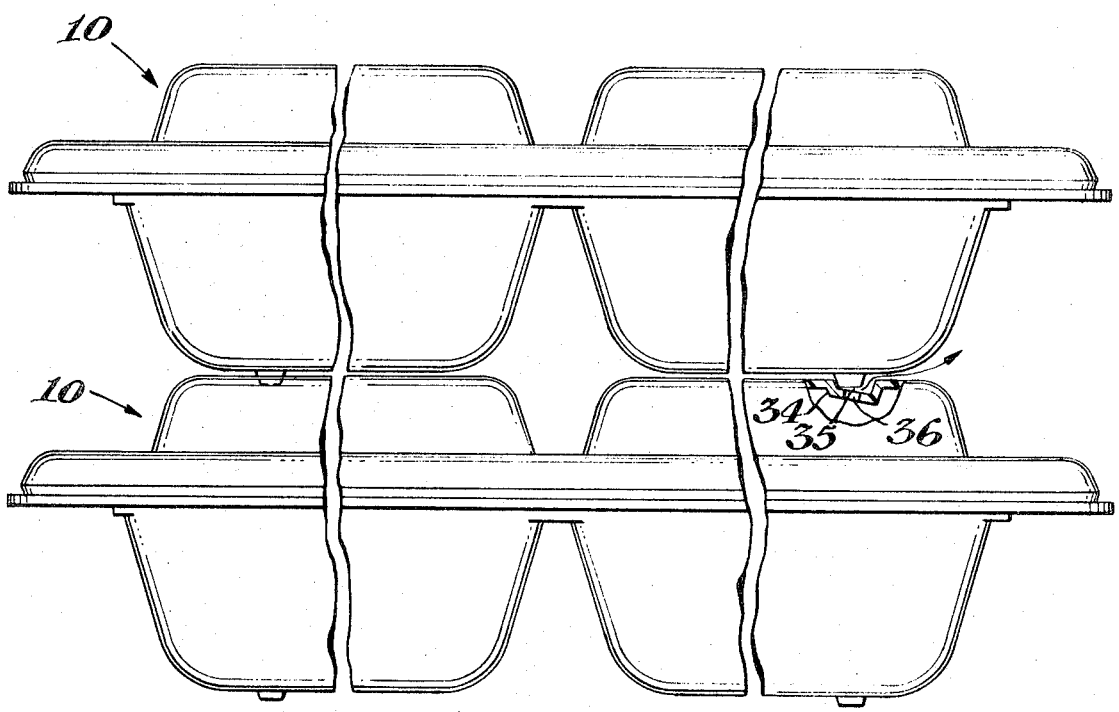
FIG. 4 is a fragmentary cross-sectional view of two such trays nested together and containing food products.

While the feet 31 of bosses 32 are shown generally flat and horizontally disposed, the base 33 of recess 34 is inclined at a significant angle from the horizontal, e.g., here shown at about 10°, so that the bottom thereof does not permit a foot 31 to seat thereacross and thereby close off a vent 36 formed by a hole located through the base 33. The location of the vent 36 should be away from the place of contact or near contact with a foot 31 engaged in said recess. Here the vent 36 is located at about the center of base 33. The gap 35 between the foot 31 and the base 33 provides an escape channel for excess moisture, the escape passageway being indicated by arrows in FIG. 4. Such moisture, if not permitted to escape, would otherwise collect on the inner surface 38 of the lid when hot foods are contained in the plate 12. Of course, it can be appreciated that a gap 35 can also be obtained by instead inclining the feet 31 from the horizontal while leaving the base 33 horizontally disposed (not shown). Likewise the size of gap 35 could be increased by having both the feet 31 and base 33 both inclined in opposite directions (not shown) from the horizontal.

It is important that the vent 36 be of sufficient diameter or size so as to release excess moisture. The term "excess moisture" means that amount of moisture which would otherwise accumulate on the lid's inner surface 38 and drop on the food. For example, in a thermoplastic tray formed of polystyrene foam having a thickness of about 70 mils and a density of about 6 lbs./ft.$^3$, with a length of about 9 inches, a width of about 7 inches and a height of about 2 inches, it has been found that a vent having a diameter of about 0.05 inches works satisfactorily for most customary hot food uses. The vent 36 can be readily formed by having base 33 of recess 34 pierced by a pin in the mold at the time of forming of the lid 14. Trays 10 are formed out of polystyrene or other thermoplastic foams by well-known techniques as, for example, by steam chest expanded bead molding or by vacuum and/or matched die thermoforming of foam sheet. If desired, a film of polystyrene can be laminated to the foam. The skin formed by said film can have a thickness of only about 1 to 3 mils and be quite satisfactory. The foam can have a thickness of from about 40 to 90 mils and a density of from about 4 to 12 lbs./ft.$^3$.

Of course, the trays of this invention can also be formed of other materials, such as polystyrene sheet commonly referred to as either the high-impact or medium-impact variety made from rubber modified polystyrene materials. The even more common general purpose polystyrene sheet as well as other well-known thermoplastic sheet materials might also be used in certain applications. Such sheet materials can be vacuum and/or matched die thermoformed or injection molded and have a thickness of from about 20 to 60 mils, for example. The foam or film materials and their thickness and other characteristics useable in the trays of this invention can be varied to meet particular needs. Thus, while certain representative embodiments and details have been shown for the purpose of illustrating the invention, it will be apparent to those skilled in the art that various changes and modifications can be made therein without departing from the spirit and scope of the invention.

We claim:

1. A compartmented food tray comprising a plate and a lid, said plate including a plurality of compartments each surrounded about its periphery by an upwardly extending partition, said lid including a plurality of compartments each surrounded about its periphery by a downwardly extending partition, means for securing said lid to said plate, each said plate partition and each said lid partition mating when said lid is secured to said plate such that their respective compartments are in registration, a stacking boss extending downwardly from the bottom of more than one of said plate compartments, a stacking recess extending downwardly from the top of more than one of said lid compartments, each said boss being in alignment with a respective one of said recesses such that a plate of one such tray can nest in the lid of another such tray located immediately therebelow, said lid including a vent in the base of at least one of said recesses.

2. The compartmented food tray of claim 1, wherein each of said compartments of said plate have at least one of said stacking bosses and each of said compartments of said lid have at least one of said recesses.

3. The compartmented food tray of claim 1 wherein at least a vented base of one of said recesses or foot of a stacking boss aligned with such recess is generally inclined from the horizontal so as to provide a gap therebetween when the foot of one such base is nested in one such recess.

4. The compartmented food tray of claim 2, wherein the feet of said stacking bosses are generally flat and horizontally disposed and the bases of said recesses are generally inclined from the horizontal so as to provide a gap therebetween when the feet are nested in the recesses.

5. The compartmented food tray of claim 4, wherein said vent is a hole located away from place of contact or near contact with each stacking boss foot engaged in each said stacking recess.

6. The compartmented food tray of claim 5, wherein said vent is located about the center of the base of each recess, hot food is contained in at least one of the compartments, the vent being of sufficient diameter so as to release moisture which would otherwise accumulate on the lids' undersurface and drop on the food, said vent and said gap providing an escape channel for such excess moisture when a plurality of such trays are nested together in a stack.

7. The compartmented food tray of claim 6, wherein said plate and lid includes mating indexing means for maintaining each lid in proper orientation with each plate when engaged together.

8. The compartmented food tray of claim 7, which is formed of a polystyrene foam material to provide insulation properties for hot foods which can be transported to a serving area remote from the cooking area.

9. The compartmented food tray of claim 8 wherein the foam has a thickness of from 40 to 90 mils and a density of from about 4 to 12 lbs./ft.$^3$ 10. The compartmented food tray of claim 9, wherein the foam is about 70 mils thick, has a density of about 6 lbs./ft.$^3$, and said vent hole has a diameter of about 0.05 inches.

11. The compartmented food tray of claim 10, wherein a film of polystyrene is laminated with the foam to form a skin therewith.